United States Patent
Wojnowicz et al.

(10) Patent No.: US 9,946,876 B2
(45) Date of Patent: *Apr. 17, 2018

(54) WAVELET DECOMPOSITION OF SOFTWARE ENTROPY TO IDENTIFY MALWARE

(71) Applicant: Cylance Inc., Irvine, CA (US)

(72) Inventors: Michael Wojnowicz, Irvine, CA (US); Glenn Chisholm, Irvine, CA (US); Matthew Wolff, Newport Beach, CA (US); Derek A. Soeder, Irvine, CA (US); Xuan Zhao, Irvine, CA (US)

(73) Assignee: Cylance Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/236,316

(22) Filed: Aug. 12, 2016

(65) Prior Publication Data

US 2016/0378984 A1    Dec. 29, 2016

Related U.S. Application Data

(63) Continuation of application No. 14/673,605, filed on Mar. 30, 2015, now Pat. No. 9,465,940.

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06F 21/56* | (2013.01) |
| *G06N 3/08* | (2006.01) |

(52) U.S. Cl.
CPC .......... *G06F 21/565* (2013.01); *G06F 21/562* (2013.01); *G06N 3/08* (2013.01); *G06F 21/56* (2013.01); *G06F 2221/034* (2013.01)

(58) Field of Classification Search
CPC .......................................... G06F 21/56–21/565
See application file for complete search history.

(56) References Cited

U.S. PATENT DOCUMENTS

| | | |
|---|---|---|
| 5,841,947 A | 11/1998 | Nordin |
| 6,430,590 B1 | 8/2002 | Fischer |

(Continued)

FOREIGN PATENT DOCUMENTS

EP    1762957 A1    3/2007

OTHER PUBLICATIONS

Baysa, D. et al., "Structural entropy and metamorphic malware", Apr. 14, 2013, Springer-Verlag France 2013, J Comput Virol Hack Tech (2013), pp. 179-192.*

(Continued)

*Primary Examiner* — Daniel Potratz
(74) *Attorney, Agent, or Firm* — Jones Day (57) ABSTRACT

A plurality of data files is received. Thereafter, each file is represented as an entropy time series that reflects an amount of entropy across locations in code for such file. A wavelet transform is applied, for each file, to the corresponding entropy time series to generate an energy spectrum characterizing, for the file, an amount of entropic energy at multiple scales of code resolution. It can then be determined, for each file, whether or not the file is likely to be malicious based on the energy spectrum. Related apparatus, systems, techniques and articles are also described.

30 Claims, 3 Drawing Sheets

(56) References Cited

U.S. PATENT DOCUMENTS

| | | |
|---|---|---|
| 6,546,551 B1 | 4/2003 | Sweeney et al. |
| 6,748,593 B1 | 6/2004 | Brenner et al. |
| 7,181,768 B1 | 2/2007 | Ghosh et al. |
| 7,240,048 B2 | 7/2007 | Pontius |
| 7,937,705 B1 | 5/2011 | Prael et al. |
| 7,945,902 B1 | 5/2011 | Sahoo |
| 8,135,994 B2 | 3/2012 | Keromytis et al. |
| 8,347,272 B2 | 1/2013 | Sugawara et al. |
| 8,370,613 B1 | 2/2013 | Manadhata et al. |
| 8,549,647 B1 | 10/2013 | Mason et al. |
| 8,631,395 B2 | 1/2014 | Sathyanathan et al. |
| 8,818,923 B1 | 8/2014 | Hoffmann |
| 8,887,163 B2 | 11/2014 | Rastogi |
| 8,930,916 B1 | 1/2015 | Soeder et al. |
| 9,015,685 B2 | 4/2015 | Greiner et al. |
| 9,104,525 B2 | 8/2015 | Dang et al. |
| 9,176,842 B2 | 11/2015 | Chen et al. |
| 9,262,296 B1 | 2/2016 | Soeder et al. |
| 9,378,012 B2 | 6/2016 | Soeder et al. |
| 2003/0097617 A1 | 5/2003 | Goeller et al. |
| 2005/0049497 A1 | 3/2005 | Krishnan et al. |
| 2005/0102246 A1 | 5/2005 | Movellan et al. |
| 2005/0223238 A1* | 10/2005 | Schmid ............... G06F 21/563 713/188 |
| 2006/0047807 A1 | 3/2006 | Magnaghi et al. |
| 2006/0112388 A1 | 5/2006 | Taniguchi et al. |
| 2006/0282476 A1 | 12/2006 | Dolby et al. |
| 2008/0133571 A1 | 6/2008 | O'Sullivan et al. |
| 2008/0184367 A1* | 7/2008 | McMillan ............. G06F 21/563 726/23 |
| 2008/0288965 A1 | 11/2008 | Grechanik et al. |
| 2009/0132449 A1 | 5/2009 | Nagashima |
| 2009/0133125 A1 | 5/2009 | Choi et al. |
| 2010/0082400 A1 | 4/2010 | Bagherjeiran et al. |
| 2010/0082513 A1 | 4/2010 | Liu |
| 2010/0107170 A1 | 4/2010 | Stehley |
| 2010/0107245 A1 | 4/2010 | Jakubowski et al. |
| 2010/0318999 A1 | 12/2010 | Zhao et al. |
| 2010/0325620 A1 | 12/2010 | Rohde et al. |
| 2011/0004574 A1 | 1/2011 | Jeong et al. |
| 2011/0040825 A1 | 2/2011 | Ramzan et al. |
| 2011/0093426 A1* | 4/2011 | Hoglund .............. G06F 21/562 706/52 |
| 2011/0138369 A1 | 6/2011 | Chandra et al. |
| 2012/0079490 A1 | 3/2012 | Bond et al. |
| 2012/0221497 A1 | 8/2012 | Goyal et al. |
| 2012/0278884 A1* | 11/2012 | Menoher .............. G06F 21/564 726/22 |
| 2012/0323853 A1 | 12/2012 | Fries et al. |
| 2013/0103380 A1 | 4/2013 | Brandstatter et al. |
| 2013/0152200 A1 | 6/2013 | Alme et al. |
| 2013/0205279 A1 | 8/2013 | Osminer et al. |
| 2013/0227683 A1 | 8/2013 | Bettini et al. |
| 2013/0263097 A1 | 10/2013 | Dawson et al. |
| 2013/0291111 A1 | 10/2013 | Zhou et al. |
| 2014/0068768 A1* | 3/2014 | Lospinuso ............ G06F 21/562 726/23 |
| 2014/0090061 A1 | 3/2014 | Avasarala et al. |
| 2014/0180738 A1 | 6/2014 | Phillipps et al. |
| 2014/0250429 A1 | 9/2014 | Greiner et al. |
| 2014/0358828 A1 | 12/2014 | Phillipps et al. |
| 2014/0372513 A1 | 12/2014 | Jones |
| 2014/0379619 A1 | 12/2014 | Permeh et al. |
| 2015/0039543 A1 | 2/2015 | Athmanathan et al. |
| 2015/0106310 A1 | 4/2015 | Birdwell et al. |
| 2015/0227741 A1 | 8/2015 | Permeh et al. |
| 2015/0227742 A1 | 8/2015 | Pereira |
| 2015/0248556 A1* | 9/2015 | Sickendick .......... G06F 21/563 726/23 |

OTHER PUBLICATIONS

Runwal, Neha et al. "Opcode graph similarity and metamorphic detection." *J Comput Virol*. Springer-Verlag, PA, vol. 8, No. 1-2, Apr. 3, 2012 (Apr. 3, 2012), pp. 37-52.

Shabtai, Asaf et al. "Detecting unknown malicious code by applying classification techniques on OpCode patterns." *Security Informatics*.vol. 1. No. 1. Feb. 27, 2012 (Feb. 27, 2012). p. 1.

"Data Type". *Wikipedia: The Free Encyclopedia*. Wikimedia Foundation, Inc. Jul. 20, 2015. Web. Jul. 20, 2015. URL: https://en.wikipedia.org/wiki/Data_type.

"File System". *Wikipedia: The Free Encyclopedia*. Wikimedia Foundation, Inc. Jul. 11, 2015. Web. Jul. 20, 2015. URL: https://en.wikipedia.org/wiki/File_system.

Bai, Lili, et al. "Detecting malicious behavior using critical api-calling graph matching." Information Science and Engineering (ICISE), 2009 1st International Conference on. IEEE, 2009.

Baysa, Donabelle, Richard M. Low, and Mark Stamp. "Structural entropy and metamorphic malware." Journal of computer virology and hacking techniques 9.4 (2013): 179-192.

Bird, Steven et al. "Annotation Tools Based on the Annotation Graph API." Jul. 2001. 4 pages.

Buchanan, Bruce G., and Reid G. Smith. "Fundamentals of expert systems." Annual review of computer science 3.1 (1988): 23-58.

Cesare, Silvio, and Yang Xiang. "Classification of malware using structured control flow." Proceedings of the Eighth Australasian Symposium on Parallel and Distributed Computing—vol. 107. Australian Computer Society, Inc., 2010.

Cesare, Silvio, Yang Xiang, and Wanlei Zhou. "Malwise—an effective and efficient classification system for packed and polymorphic malware." IEEE Transactions on Computers 62.6 (2013): 1193-1206.

Chen, Zhi, et al. "Effect of nonstationarities on detrended fluctuation analysis." Physical Review E 65.4 (2002): 041107.

Choi, Yang-seo, et al. "PE File Header analysis-based packed PE file detection technique (PHAD)." Computer Science and its Applications, 2008. CSA'08. International Symposium on. IEEE, 2008.

Dahl et al. "Large-Scale Malware Classification Using Random Projections and Neural Networks." *2013 IEEE International Conference on Acoustics, Speech and Signal Processing (ICASSP)*. May 26-31, 2013. Vancouver, BC. pp. 3422-3426.

De Campos, Luis M. et al. "Bayesian Networks Classifiers for Gene-Expression Data". *Intelligent Systems Design and Applications (ISDA)*. 2011 11th International Conference on, IEEE, Nov. 22, 2011, pp. 1200-1206, XP032086221, DOI: 10.1109/ISDA.2011.6121822 ISBN: 978-1-4577-1676-8.

Eagle. "Chapter 1: Introduction to Disassembly." *The IDA PRO Book: The Unofficial Guide to the World's Most Popular Disassembler*. San Francisco: No Starch Press. 2nd Edition(2011):3-14.

Friedman, Jerome, Trevor Hastie, and Rob Tibshirani. "Regularization paths for generalized linear models via coordinate descent." Journal of statistical software 33.1 (2010): 1.

Gelman, Andrew. "Scaling regression inputs by dividing by two standard deviations." Statistics in medicine 27.15 (2008): 2865-2873.

Ho, Kalon KL, et al. "Predicting survival in heart failure case and control subjects by use of fully automated methods for deriving nonlinear and conventional indices of heart rate dynamics." Circulation 96.3 (1997): 842-848.

Iczelion. "Tutorial 1: Overview of PE File format." *Programming Horizon*. Jun. 1, 2013. Wayback Machine. Web. Feb. 23, 2015.

Inoue, Hajime "Anomaly Detection in Dynamic Execution Environments." Abstract of Dissertation. Jan. 31, 2005 (Jan. 31, 2005). XP055191583. ISBN: 978-0-54-249408-6. 190 pages. Retrieved from the Internet: URL:https://www.cs.unm.edu/~forrest/dissertations/inoue-dissertation.pdf [retrieved on May 26, 2015].

Kandaswamy, A., et al. "Neural classification of lung sounds using wavelet coefficients." Computers in Biology and Medicine 34.6 (2004): 523-537.

Killick, Rebecca, Paul Fearnhead, and Idris A. Eckley. "Optimal detection of changepoints with a linear computational cost." Journal of the American Statistical Association 107.500 (2012): 1590-1598.

Kolter, Jeremy Z., and Marcus A. Maloof. "Learning to detect malicious executables in the wild." Proceedings of the tenth ACM SIGKDD international conference on Knowledge discovery and data mining. ACM, 2004.

(56) References Cited

OTHER PUBLICATIONS

Lyda, Robert, and James Hamrock. "Using entropy analysis to find encrypted and packed malware." IEEE Security & Privacy 5.2 (2007).
Mahoney, Matthew V., and Philip K. Chan. PHAD: Packet header anomaly detection for identifying hostile network traffic. 2001.
Muggeo, Vito MR. "Segmented: an R package to fit regression models with broken-line relationships." R news 8.1 (2008): 20-25.
Nataraj, Lakshmanan, et al. "A comparative assessment of malware classification using binary texture analysis and dynamic analysis." Proceedings of the 4th ACM workshop on Security and artificial intelligence. ACM, 2011.
Nguyen, Hoan Anh et al. "A Graph-based Approach to API Usage Adaptation." *OOPSLA/SPLASH '10*. Oct. 17-21, 2010. Reno/Tahoe, Nevada, USA. Oct. 2010:(302-321).
O'Kane, Philip, Sakir Sezer, and Kieran McLaughlin. "Obfuscation: The hidden malware." IEEE Security & Privacy 9.5 (2011): 41-47.
Omerhodzic, Ibrahim, et al. "Energy distribution of EEG signals: EEG signal wavelet-neural network classifier." arXiv preprint arXiv:1307.7897 (2013).
Park, Juhyun, and Cheolwoo Park. "Robust estimation of the Hurst parameter and selection of an onset scaling." Statistica Sinica (2009): 1531-1555.
Pascanu, Razvan et al. "Malware classification with recurrent networks." *2015 IEEE International Conference on Acoustics, Speech and Signal Processing (ICASSP)*. Apr. 19, 2015 (Apr. 19, 2015). pp. 1916-1920. ISBN: 978-1-4673-6997-8.
Pascanu, Razvan. *On Recurrent and Deep Neural Networks*. Thesis. University of Montreal, May 2014. Montreal, Canada. Degree Granted on Feb. 18, 2015. Selected Chapters 1, 2 and 6. 87 pages. Web. Retrieved on Jul. 21, 2016.
Perdisci, Roberto, Andrea Lanzi, and Wenke Lee. "Classification of packed executables for accurate computer virus detection." Pattern recognition letters 29.14 (2008): 1941-1946.
Rieck et al. "Automatic analysis of malware behavior using machine learning." *Journal of Computer Security*. 19(2011):639-668.
Samak, Taghrid et al. "Online Fault and Anomaly Detection for Large-Scale Scientific Workflows". *High Performance Computing and Communications (HPCC)*, 2011 IEEE 13th International Conference on, IEEE, Sep. 2, 2011, pp. 373-381, XP032068211, DOI: 10.1109/HPCC.2011.55 ISBN: 978-1-4577-1564-8.
Schultz, Matthew G., et al. "Data mining methods for detection of new malicious executables." Security and Privacy, 2001. S&P 2001. Proceedings. 2001 IEEE Symposium on. IEEE, 2001.
Shabtai, A et al. "Detection of malicious code by applying machine learning classifiers on static features: A state-of-the-art survey". *Information Security Technical Report, Elsevier Advanced Technology*. Amsterdam, NL, vol. 14, No. 1, Feb. 1, 2009, pp. 16-29, XP026144093, ISSN: 1363-4127.
Shafiq, M. Zubair, S. Tabish, and Muddassar Farooq. "PE-probe: leveraging packer detection and structural information to detect malicious portable executables." Proceedings of the Virus Bulletin Conference (VB). 2009.
Shafiq, M. Zubair, Syed Ali Khayam, and Muddassar Farooq. "Embedded malware detection using markov n-grams." International Conference on Detection of Intrusions and Malware, and Vulnerability Assessment. Springer Berlin Heidelberg, 2008.
Shin, DaeMin et al. "Data Hiding in Windows Executable Files." *Proceedings of the 6th Australian Digital Forensics Conference*. Edith Cowan University. Perth Western Australia. Dec. 3, 2008. Research Online.
Siddiqui, M., Wang, M.C., & Lee, J. (2008). Data mining methods for malware detection using instruction sequences. In *Artificial Intelligence and Applications* (pp. 358-363).
Sorokin, Ivan. "Comparing files using structural entropy." Journal in computer virology 7.4 (2011): 259-265.
Stolfo, Salvatore J. et al. "Anomaly Detection in Computer Security and an Application to File System Accesses". In: "Lecture Notes in Computer Science". Jan. 31, 2005(Jan. 31, 2005). M.S Hacid et al. (Eds):ISMIS 2005, LNAI. Springer. Berlin, Heidelberg. XP055192090. vol. 3488:14-28.
Subasi, Abdulhamit. "EEG signal classification using wavelet feature extraction and a mixture of expert model." Expert Systems with Applications 32.4 (2007): 1084-1093.
Tabish, S. Momina, M. Zubair Shafiq, and Muddassar Farooq. "Malware detection using statistical analysis of byte-level file content." Proceedings of the ACM SIGKDD Workshop on CyberSecurity and Intelligence Informatics. ACM, 2009.
Tian, Ronghua, et al. "An automated classification system based on the strings of trojan and virus families." Malicious and Unwanted Software (MALWARE), 2009 4th International Conference on. IEEE, 2009.
Wang, Xun et al. "Detecting Worms via Mining Dynamic Program Execution." Third International Conference on Security and Privacy in Communications Networks and the Workshops, 2007. SECURECOMM 2007. IEEE. Piscataway, NJ. USA. Sep. 17, 2007 (Sep. 17, 2007) pp. 412-421. XP031276575. ISBN: 978-1-4244-0974-7.
Xu, J-Y. et al. "Polymorphic Malicious Executable Scanner by API Sequence Analysis." *Proceedings of the Fourth International Conference on Hybrid Intelligent Systems. (HIS 2004)*.Kitakyushu, Japan. Dec. 5-8, 2004. Piscataway, NJ, USA,IEEE, Dec. 5, 2004 (Dec. 5, 2004), pp. 378-383, XP010778797.

* cited by examiner

WAVELET DECOMPOSITION OF SOFTWARE ENTROPY TO IDENTIFY MALWARE

This application is a continuation application of U.S. patent application Ser. No. 14/673,605, filed Mar. 30, 2015, entitled "WAVELET DECOMPOSITION OF SOFTWARE ENTROPY TO IDENTIFY MALWARE." The contents of the aforementioned application are hereby incorporated by reference in their entirety

TECHNICAL FIELD

The subject matter described herein relates to the use of wavelet decomposition of software entropy to identify symptoms indicative of malware in the energy spectrum.

BACKGROUND

Sophisticated authors of malicious code (aka malware) often sneak malicious and hidden commands into portable executable files. Such hidden commands can be hard to detect, especially if they are encrypted or compressed. Failure to detect malicious commands can allow the malicious code to intrude into or otherwise infect the software and/or computing devices executing such code.

SUMMARY

In one aspect, a plurality of data files is received. Thereafter, each file is represented as an entropy time series that reflects an amount of entropy across locations in code for such file. A wavelet transform is applied, for each file, to the corresponding entropy time series to generate an energy spectrum characterizing, for the file, an amount of entropic energy at multiple scales of code resolution. It can then be determined, for each file, whether or not the file is likely to be malicious based on the energy spectrum.

The determination of whether nor not a file is likely to be malicious can be accomplished by generating, using at least one predictive model trained using data sets comprising files known to contain malware, a suspiciously structured entropy score for each file such that files having a score above a pre-defined threshold are determined to be likely malicious and files having a score below the pre-defined threshold are determined to be not likely malicious. Various types of predictive models can be utilized, including, but not limited to logistic regression models, neural network models and/or support vector machines.

At least one of the files determined to be likely malicious can include encrypted and/or compressed segments concealing malicious commands.

The representing can include parsing each file into a plurality of chunks that each correspond to a different one of the locations.

Various types of wavelet transforms can be used including, for example, a Haar wavelet transform.

In an interrelated aspect, a data file is received. This data file is then represented as an entropy time series that reflects an amount of entropy across locations in code for the file. It is later determined, by at least one predictive model using the entropy time series for the file, whether or not the file is likely to be malicious.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many technical advantages. For example, the current subject matter provides enhanced techniques for identifying malicious commands within code that are compressed and/or encrypted.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter provides systems, methods, and computer program products that address the issue of detecting malicious commands within portable executable files that are encrypted or compressed. As will be described in further detail below, the current inventors discovered that when an executable file shifts between native code, encrypted or compressed code, and padding, there can be corresponding shifts in the file's representation as an entropy time series. The current subject matter provides for automatic quantification of the extent to which the patterned variations in a file's entropy time series makes it suspicious.

In the development of the current subject matter, a corpus of n=39,968 portable executable files was studied, 50% of which were malicious. Each file was represented as an entropy time series, reflecting the amount of entropy across locations in the file code, and wavelet transforms were applied to this entropy time series in order to extract the amount of entropic energy at multiple scales of code resolution. Based on this entropic energy spectrum, a suspiciously structured entropy score (SSES) was derived, a single scalar feature which quantifies the extent to which a given file's entropic energy spectrum makes the file suspicious as possible malware. The current inventors found that, based on SSES alone, it was possible to predict with 68.7% accuracy whether a file in this corpus was malicious or legitimate (an 18.7% gain over random guessing). Moreover, SSES can be combined with any number of additional features in a malware classifier of choice. To illustrate this possibility, the inventors formed a nine feature model including SSES and eight simple entropy summary statistics that achieved 74.3% predictive accuracy.

The current subject matter is particularly useful for malware files that contain encrypted or compressed ("packed") segments which conceal malicious commands. Entropy analysis can be used in this regard because files with high entropy are relatively likely to have encrypted or compressed sections inside them. The entropy of a random variable can generally reflect the amount of uncertainty about that variable—that is, the lack of knowledge about what value the variable will take on. In the context of software analysis, an executable file can be represented as a string of hexadecimals (00hFFh), where each observed hexadecimal character is considered to be an instantiation of a random variable (for example, with 256 possible values). A string of these hexadecimal characters can be bundled up into a "chunk" of a file, and the statistical variation within that chunk can be estimated by computing the entropy within the chunk. Zero entropy means that the same character was repeated over and over (as might occur in a "padded" chunk of code) and maximum entropy means that a chunk consisted of entirely distinct values. Chunks of code that have been compressed or encrypted tend to have higher entropy than native code.

Sophisticated contemporary concealments of malicious code may not be detectable through simple entropy statistics, such as mean file entropy. Relatively sophisticated authors of malware try to conceal the existence of hidden encrypted or compressed commands, for instance by adding additional padding (zero entropy chunks), so that the mean entropy of an executable file with hidden malicious code looks identical to that of a benign executable.

In order to automatically identify the degree of entropic structure within a piece of software, each portable executable file can be represented, either wholly, or partially, as an entropy time series (and as further described below). The entropy time series can characterize the amount of entropy over a small snippet/chunk of code in a certain location of the file. The amount of entropic structure can then be quantified, with the goal of differentiating between, for example, a low-structured time series with a single local mean and variation around that mean, versus a highly-structured time series whose local mean changes many times over the course of the file.

The suspiciously structured entropy score (SSES) can be used to quantify the suspiciousness of the structured entropy within a piece of software. SSES can be calculated using, in part, a wavelet transform. The wavelet transform can be used extract the amount of detail exhibited within a signal at various locations over various levels of resolution. In essence, the wavelet transform as used herein can transform a one-dimensional function of location (e.g., file location, etc.) into a two-dimensional function of location and scale. By using the output of the wavelet transform (the so-called "wavelet coefficients"), a series of coarse-to-fine approximations of an original function can be obtained. These successive approximations can be used to determine the multi-scale structure of the entropy signal, in particular the energy available at different levels of resolution.

There are various types of wavelet transforms including Haar wavelets which form a particularly simple family of wavelets whose members are piecewise constant. The Haar wavelet transform can project an original entropy signal onto a collection of piecewise constant functions which oscillate as a square wave over bounded support (i.e. assume nonzero values only on certain bounded intervals). As these piecewise constant functions have supports which vary in their scale (width) and location, the resulting projections can describe the detail within the time series at various locations and resolutions.

More specifically, the Haar wavelet transform is based upon a so called mother function, $\psi(t)$, defined by:

$$\psi(t) = \begin{cases} 1, & t \in [0, 1/2) \\ -1, & t \in [1/2, 1) \\ 0, & \text{otherwise} \end{cases}$$

a very simple step function. Given the Haar mother function $\psi(t)$, a collection of dyadically scaled and translated wavelet functions $\psi_{j,k}(t)$ can be formed by:

$$\psi_{j,k}(t) = 2^{j/2} \psi(2^j t - k)$$

where the integers j, k are scaling parameters. The dilation parameter j indexes the level of detail or resolution at a particular stage of analysis, and the translation parameter k selects a certain location within the signal to be analyzed. Note that as the scaling parameter j increases, the function $\psi_{j,k}(t)$ applies to (is non-zero over) successively finer intervals of the signal.

Given a time series x(t) where t=1 . . . T, the time series can be first rescaled so that the final observation occurs at time t=1, and then the so-called "mother wavelet coefficient" at scale j and location k can be given by the inner product of the time series with the wavelet. As discrete signals are being utilized, the inner product takes the form:

$$d_{j,k} = \langle x, \psi_{j,k} \rangle = \sum_{t=1}^{T} x(t) \psi_{j,k}(t),$$

One interpretation of this coefficient is that it gives the (scaled) difference between local averages of time series across neighboring chunks or bins. The size of the neighboring chunks is determined by the scaling parameter j.

The family of mother wavelet coefficients $d_{j,k}$ can enable a multi-resolution analysis (MRA) of the time series x(t). In particular, the time series x(t) can be decomposed into a series of approximations xj(t), whereby each successive approximation $x_{j+1}(t)$ is a more detailed refinement of the previous approximation, xj(t). The functional approximations can be obtained through the wavelet coefficients by the formula:

$$x_j + 1(t) = x_j(t) + \sum_{k=0}^{2^j - 1} d_{j,k} \psi_{j,k}(t)$$

where $x_0(t)$, the coarsest-level functional approximation, is the mean of the full time series. Thus, the collection of mother wavelet coefficients $d_{j,k}$ store the "details" that allow one to move from a coarser approximation to a finer approximation. Examples of successive functional approximations, in the context of software entropy signals, are provided below.

The following describes the use of wavelet-based classifiers. Using the wavelet transform, it can be possible to summarize the overall amount of detail in a time series at various levels of resolution. The total amount of detail at a particular (jth) level of resolution can be referred to as the energy at that level of resolution:

$$E_j = \sum_{k=1}^{2^{j-1}} (d_{jk})^2 \quad (1)$$

The distribution of energy across various levels of resolution, as used herein, can be referred to as an energy spectrum. As used herein, the term wavelet based classifier strategy refers to the use of wavelet coefficients as features in a classifier. Such wavelet coefficients can be used as features within any machine learning or statistical classifier (logistic regression or lasso logistic regression, decision trees, support vector machines, etc.) depending upon which classification method is maximally relevant to the problem at hand. For illustrative purposes, a logistic regression model can be used for modeling purposes because such a model provides an atomic analysis of the relationship between the wavelet-based features and classification categories. In particular, logistic regression can be used to determine which levels of resolution (in the entropy time series representation of a piece of software) exert the strongest influences on the probability of a file being malware, and whether energy at those levels of resolution make the likelihood of such file being malicious larger or smaller.

One fundamental problem with applying wavelet-based classifiers to malware analysis is that executable files have different lengths. Controlled observational situations produce time series samples of fixed length that are held constant across the data set. In contrast, in uncontrolled observational contexts, time series lengths can differ wildly from sample to sample. Software samples, as one example, can exhibit huge variation in their length, from a handful of kilobytes to hundreds of megabytes.

The following describes how to compare the suspiciousness of a file's entropy patterns, even though executable files differ in length, and therefore have differently sized entropy time series, and resultantly differently sized energy spectra. With the current subject matter, each file's J-dimensional energy spectrum can be transformed into a single scalar feature, a 1-dimensional suspiciously structured entropy score (SSES). The computation of SSES can comprises two operations: first, the wavelet-based energy spectrum of a file's entropy time series can be computed, and second, the file's malware propensity score can be computed from that energy spectrum. The latter operation can refer to a statistical model that is trained/learned on a corpus of files. One type of model which can be used is logistic regression; however, other types of models, such as neural networks, support vector machines, and other machine learning models, can be utilized. The dependence of the SSES feature on a statistical model can make it a meta-feature that differentiates the feature from simpler features, such as mean entropy or maximum entropy, which can be calculated directly based on observation of a single file without reference to a model. Once computed, SSES can then be combined with other features that are predictive of malware categorization in a second-level model. In some implementations, logistic regression can be utilized at the second level as well. Such an approach can be analogized to fitting a neural network model with a single hidden layer, where the input layer flexibly accommodates J features from the entropic energy spectrum, and where the hidden layer includes ESS as well as other features of the file relevant to malware detection.

In an analysis performed by the inventors of the current subject matter, the data set comprised n=39,968 portable executable files from a data repository. 19,988 (50.01%) of these files were known to be malicious, and the remaining files were benign.

Figure 1:
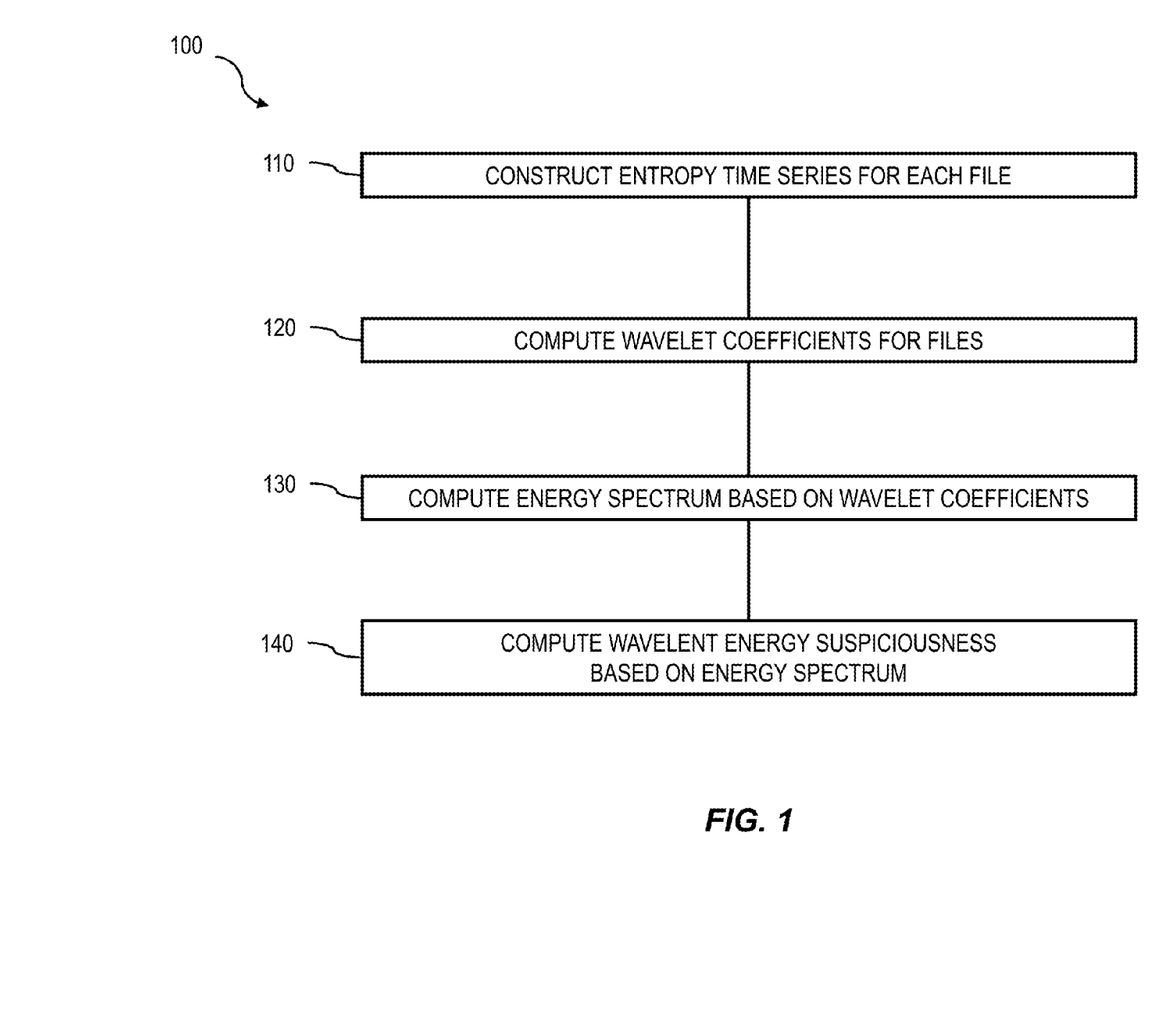
FIG. 1 is a diagram illustrating a process of wavelet decomposition of software entropy to identify files or portion of files likely to comprise malware.

With reference to diagram 100 of FIG. 1, initially, at 110, an entropy time series (ETS) was constructed for each file. To compute the entropy of an executable file, the original file, represented in hexadecimal (00hFFh), can be split into non-overlapping chunks of fixed length, typically 256 bytes. For each chunk of code, the entropy can then be computed using the formula below:

$$H(c) = -\sum_{i=1}^{m} p_i(c) \log_2 p_i(c), \quad (2)$$

where c represents a particular chunk of code, m represents the number of possible characters (here, n=256), and $p_i$ is the probability (observed frequency) of each character in the given chunk of code. The entropy for any given chunk can, for such a chunk size, range from a minimum of 0 to a maximum of 8. Minimum entropy would occur if the chunk consisted of a single character repeated 256 times, and maximum entropy would occur if a chunk consisted of 256 distinct hexadecimal characters.

Next, a suspiciously structured entropy score (SSES) can be generated for each file. The procedure for computing the suspiciously structured entropy score (SSES) can include the following. Wavelet coefficients can be computed, at 120, for all files which fall into length group $J=[\log_2 T]$, where T is the length of the time series. The wavelet coefficients can be obtained through the Haar Discrete Wavelet Transform. The discrete wavelet transform takes as input a discrete time series of size $T=2^J$ observations, and outputs an equivalently-sized vector of wavelet coefficients. Note that the transform requires the time series to have a dyadic length. However, if the number of observations in the executable file's entropy time series is not an integer power of 2, the series can be right-truncated at value $2^{[\log_2 T]}$.

Figure 2:
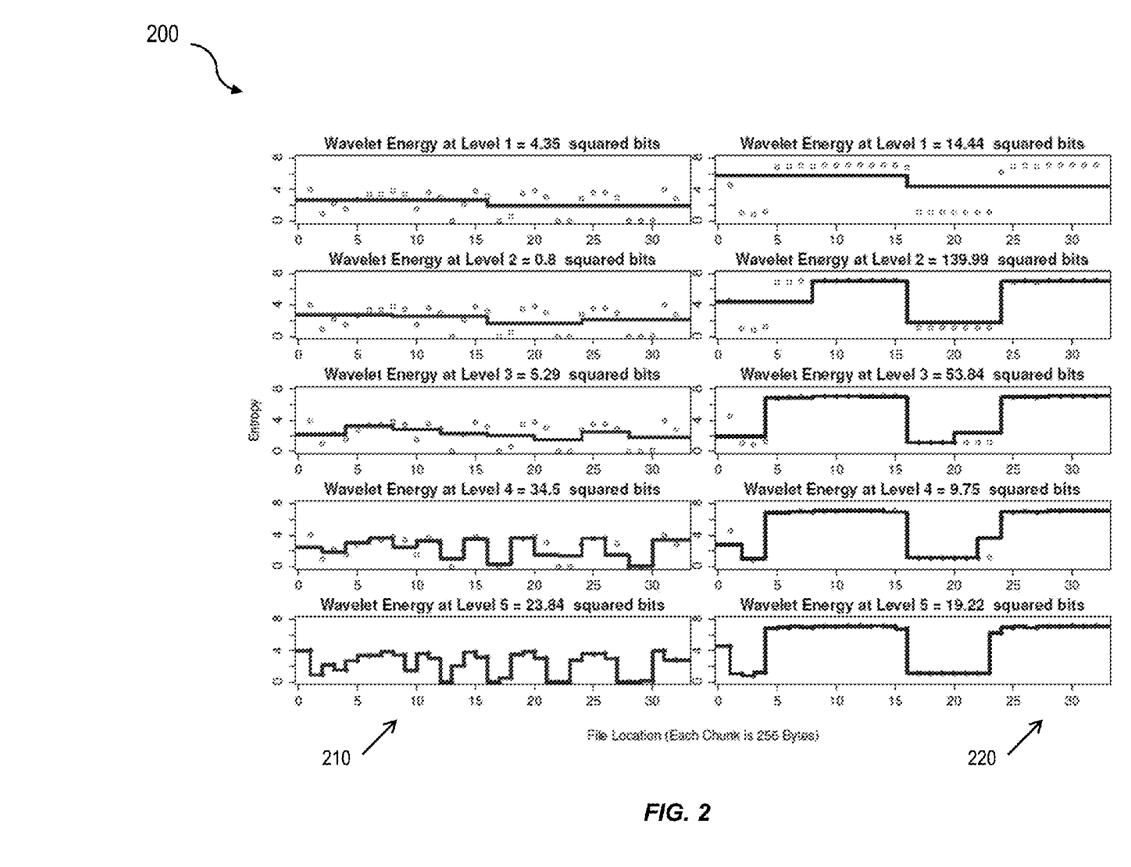
FIG. 2 is a diagram illustrating entropy at different file locations across different resolutions levels.

The first wavelet coefficient, c, can be referred to as the coarsest-level "father" wavelet coefficient. It is a scaled version of the overall sum (and therefore mean) of the time series. In particular, c can be derived as:

$$c = \frac{1}{s_1} \sum_{k=1}^{T} y_k \quad (3)$$

where the scaling factor is given by $s_1 = \sqrt{2}^T$ and is necessary for the wavelet transform to preserve the size (norm) of the time series. The father wavelet coefficient can be used in building functional approximations in the plots of diagram 200 of FIG. 2, but the coefficient can otherwise be discarded, as it is not part of energy spectrum from which SSES is derived.

The remaining T−1 wavelet coefficients, $d_{jk}$, can be referred to as the mother wavelet coefficients, which, in contrast, can be used in the computation of SSES. These mother wavelet coefficients can describe the detail at successively fine-grained resolutions. The j indexes a particular level resolution (which is related to the number of data points pooled together into a "bin"), and k indexes a particular location or bin within that resolution. The number of bins increases as j increases to finer resolutions.

For a Haar Discrete Wavelet Transform, the mother wavelet coefficients can be interpreted in a particularly simple manner, as the (scaled) differences of the mean entropy levels between neighboring bins at a particular binning width; that is, a scaling of the differences $mean_{bin2}-mean_{bin1}, mean_{bin4}-mean_{bin3}$, and so forth. In particular, the mother wavelet coefficients can be indexed such that $j \in \{1 \ldots J\}$ represents the resolution level, ordered from coarsegrained to finegrained, and $k \in \{1 \ldots 2^{j-1}\}$ represents the particular location (or bin) of the time series at that resolution level. At each resolution level j, the time series can be divided into $N_j=2^{j-1}$ nonoverlapping, adjacent bins such that each bin includes $B_j=2^{J-j}$ observations, and then the mother wavelet coefficients can be given by:

$$d_{kj} = \frac{1}{s_j}\left(\sum_{i=(2k-1)Bj+1}^{2kBj} y_i - \sum_{i=(2k-2)Bj+1}^{(2k-1)Bj} y_i\right) \quad (4)$$

where the scaling factor is $s_1=(\sqrt{2})J^{-j+1}$ and is necessary for the wavelet transform to preserve the size (norm) of the time series.

Overall, the algorithm can transform a time series, y, of length $T=2^J$ into a vector of wavelet coefficients, $d=(c, d_{1,1}, \ldots, d_{J,T-1})$, with number of data points equal to $\Sigma_{j=1}^{J} N_j+1=2^J$. Thus, the wavelet coefficient vector has the same dimensionality as the original time series. In fact, this mapping is invertible, so d can be considered as an alternative representation of the time series, one which reveals its multi-resolution structure.

Thereafter, at 130, the wavelet energy spectrum can be computed. The wavelet energy spectrum can summarize the detail or variation available at various resolution levels. The energy spectrum can be computed as a function of the mother wavelet coefficients, $d_{jk}$. In particular, the "energy", $E_j$, of the time series at the jth resolution level can be defined by:

$$E_j = \sum_{k=1}^{2^{j-1}} (d_{jk})^2 \quad (5)$$

Note that the energy at resolution level j is just the squared Euclidean norm of the vector of mother wavelet coefficients from resolution level j. After this operations, the original time series of size $T=2^J$ (and resultant wavelet vector of size $T=2^J$) can be reduced to a vector of J elements, where each element represents the amount of "energy" at a single level of resolution. The distribution of entropic energy over different resolutions can be referred to as a particular executable file's entropic energy spectrum.

Subsequently, at 140, the wavelet energy suspiciousness can be computed. The wavelet energy spectrum can be used to determine the propensity of each file to be malware (i.e., its suspiciousness). Computing this propensity can require training of at least one model (e.g., logistic regression). One variant for computing the propensity uses cross-validation. In particular, the current sample of files can then be partitioned. Such partitioning can be effected, for example, by splitting the entire set of $F_J$ files which are of the appropriate size into 5 mutually exclusive subsets $F_J^1, \ldots, F_J^5$, each of which represents exactly 20% of the entire sample.

An iterative process can then commence for each subset $F_{ij}$ where $i \in \{1, \ldots, 5\}$. First, a model (e.g., the logistic regression model, etc.) is fitted on the other four subsets which fits the class variable (malware or not) as a function of the wavelet energy spectrum. The model can produce a set of coefficients to weigh the strength of each resolution energy on the probability of being malware. Next, the model can be used to then make a prediction about files in subset $F_J^i$. In particular, the model learned as part of the fitting can be used to calculate the predicted probability that each file in set $F_J^i$ is malware, given its wavelet energy spectrum. This malware propensity (i.e., predicted malware probability) lies within the interval [0, 1], and is what is referred to herein as the suspiciously structured entropy score (SSES).

The following relates to experimental results that characterize wavelet energy spectrum for two representative files and is made with reference to diagram 200 of FIG. 2. For illustrative purposes, two portable executable files which belong to the same file size category were analyzed (more precisely, the entropic time series from two files were analyzed). In the plots 210, 220, it can be seen that the wavelet transform produces successively detailed functional approximations to these time series. Such plots 210, 220 also provide some visual indications about how the energy spectra can be derived from these successive functional approximations.

With this example, "File A" defer to the file generating the time series along the left hand column in plots 210, and "File B" to refer to the file generating the time series along the right hand column in plots 220. Files A and B belong to the same file size category, as both have entropy time series consisting of T=32 chunks, and so both files have $J=\log_2(32)=5$ levels of resolution available for a wavelet analysis. Reading these columns from top to bottom, the successively detailed functional approximations formed through wavelet analysis become apparent (as described above).

FIG. 2 also shows the wavelet-based entropic energy spectra for each file. Above each functional approximation is the energy of the time series existing at a particular level of resolution. Based on this energy spectra (or distribution of energy across various levels of resolution), the model as used herein (and as described further below) believes that File A is legitimate software, whereas File B is malware. Investigating this conclusion, it can be seen that these two files have radically different wavelet energy distributions across the 5 resolution levels. For the clean file (i.e., the file not comprising malware), the energy in the entropy time series is concentrated at the finest levels of resolution, levels j=4 and j=5 (where the energy is 34.5 and 23.84 squared bits, respectively). For the dirty file (i.e. the file comprising malware), the energy in the entropy time series is concentrated at coarser levels of analysis, peaking especially strongly at level j=2 (where the energy is 139.99 squared bits). As will be shown below, this result is representative of the general pattern for all n=1,599 files in the corpus whose length places them in file size group J=5.

The wavelet energy spectra can then be standardized, because the logistic regression coefficients can have interpretations which are sensitive to the scale of the features. To perform the standardization, the raw wavelet energy features, $E_{fj}$, can be transformed into standardized wavelet energy features $Z_{fj}$ by the formula:

$$Z_{f,j} = \frac{E_{f,j} - \overline{E_{\cdot,j}}}{SD(E_{\cdot,j})} \quad (6)$$

where f=1, . . . , 1599 indexes a particular file and j=1, . . . , 5 indexes the resolution level. To illustrate the effects of normalization, consider for example that whereas File A's raw energy at the coarsest resolution level is 4.35 squared scaled bits, its normalized energy is −0.394 squared scaled bits, meaning that the file's energy or change at the coarsest resolution level, J=5, is less than the average file in the corpus (namely, −0.394 standard deviations below mean value). Indeed, in the top left plot of FIG. 2, only a very small difference is seen between the mean entropy in the first and second halves of the file, and apparently that amount is below average for the corpus. In contrast, file A's energy at the finer levels of resolution (levels 4 and 5) is markedly above average, because $Z_{A,4}$=1.415 and $Z_{A,5}$=1.773.

The following relates how a model (e.g., a logistic regression model, etc.) can transform wavelet energy spectra into predictions about whether the file is malware (i.e., into an SSES). For illustration purposes, a subset of n=1,599 files in our corpus belonging to file size group J=5 can be considered. Because these files can be analyzed at J=5 different resolutions, 5 features can be extracted from each file, with each feature representing the energy at one level of resolution in the file's entropy time series.

After normalizing the wavelet energy features (as described above), a logistic regression model can be fit to the binary classification response (malware or not) which uses these wavelet energy features as predictor variables. The logistic regression model can estimate $P_f$, the probability that file f is malware, by the formula $$P_f = \frac{1}{1 + \exp[-Z_{f,j} \cdot \beta_j]}$$

where $Z_{f,j}$ is the normalized energy of file f at resolution level j, and $\beta j$ is a model parameter, known as a logistic regression coefficient, which must be estimated from the data. Once the logistic regression algorithm has estimated the βj values, the fitted model can be analytically investigated. In particular, the relationship between the entropic energy spectrum and code maliciousness can be explored by computing how the probability of a file being malicious, $P_f$, is affected by adding and removing energy to various resolution levels in a file's entropy time series (i.e., by toggling $Z_{f,j}$ for some j, etc.)

The fit of the logistic regression model (for both raw and normalized features) is summarized in Table 1 below. Based on those βj values, it is seen that the two sample files above and illustrated in FIG. 2 are indeed representative of a larger trend: having high energy at resolution levels 1, 2 and 3 (the coarser levels) is associated with a higher probability of the file being malware (since those βj s are positive), whereas having high energy at levels 4 and 5 (the finer levels) is associated with a lower probability of the file being malicious (because those βj's are negative). Moreover, these associations appears to be reflective of trends in the larger population of files, since the pvalues are largely strongly statistically significant. This finding makes sense if artificial encryption and compression tactics tend to elevate moderate to large sized chunks of malicious files into "high" entropy states.

Table 1, in particular, relates to investigating the relationship between the entropy wavelet energy spectrum and maliciousness for files of size J=5. Note that for the entire table, numbers outside the parentheses represent results for the normalized features, whereas numbers inside the parentheses represent results for raw features. The two "Energy" columns list the energy at all five levels of resolution for these two files. The "Value of βj" column describes the estimated beta weight in a logistic regression fitting file maliciousness to the five wavelet energy values, based on a corpus of n=1,599 files. The "P-value" column describes the probability of getting the test statistic we observed (not shown, it is a function of the data) under the hypothesis that there is no relationship between energy at that level and file maliciousness. The codes are: $*$=p<0.05, $$=p<0.01, $*$=p0.001, $**$=p<0.0001, $****$=p0.00001. The "Malware Sensitivity" represents the estimated change in the odds that a file is malware associated with an increase of one unit in the corresponding feature. It is calculated by $(e^{\beta-1})$ \times 100\%$. For the normalized values (those outside the parenthesis), an increase of one unit refers to an increase of one standard deviation).

TABLE 1

| Resolution | | | Energy Spectra | | Statistical Model For File Size J = 5 | | |
| --- | --- | --- | --- | --- | --- | --- | --- |
| Level | # Bins | Bin Size | File A | File B | Value of $\beta_j$ | P-value | Malware Sensitivity |
| 1 | 2 | 16 | −0.39 (4.35) | −0.01 (14.44) | 0.448 (0.017) | ***** | +56.5% (+1.7%) |
| 2 | 4 | 8 | −0.79 (0.80) | 6.27 (139.99) | 0.174 (0.008) | * | +19.0% (+0.89%) |
| 3 | 8 | 4 | −0.48 (5.29) | 2.18 (53.83) | 0.847 (0.046) | ***** | +133.2% (+4.74%) |
| 4 | 16 | 2 | 1.42 (34.50) | −0.37 (9.75) | −0.106 (−0.008) | n.s. | −10.0% (−0.75%) |
| 5 | 32 | 1 | 1.77 (23.84) | 1.19 (19.22) | −0.240 (0.030) | ** | −21.4% (−2.99%) |

The magnitude of the βj coefficients can be interpreted by exponentiating the coefficients and applying those values to the odds that a file is malware. For example, if the energy is raised at level 3 of an executable file's entropy time series by a single standard deviation, but the energy at all other levels is held constant, then the model estimates that the odds that a file is malicious increases by a factor of $e^{\beta_3} = e^{.847} = 2.33$ (i.e. the odds would increase by 133%). This number (in percentage form) can be referred to as malware sensitivity and values for same can be provided for all resolution levels in Table 1. Conversely, reducing the energy at level 3 by a single standard deviation (and holding the energy at other levels constant) multiplies the estimated odds that a file is malicious by a factor of $e^{-\beta_3} = e^{-0.847} = 0.428$ (i.e. those odds would drop by 57.2%).

By comparing the $\beta j$ values for the standardized features, or, alternatively, the malware sensitivity scores, it can be concluded that, out of all resolution levels, energy at resolution level 3 is most strongly associated with file maliciousness. Perhaps more importantly, it can been seen that, at least for files in file size group J=5, malware tends to concentrate entropic energy at coarser rather than finer levels of resolution.

Figure 3:
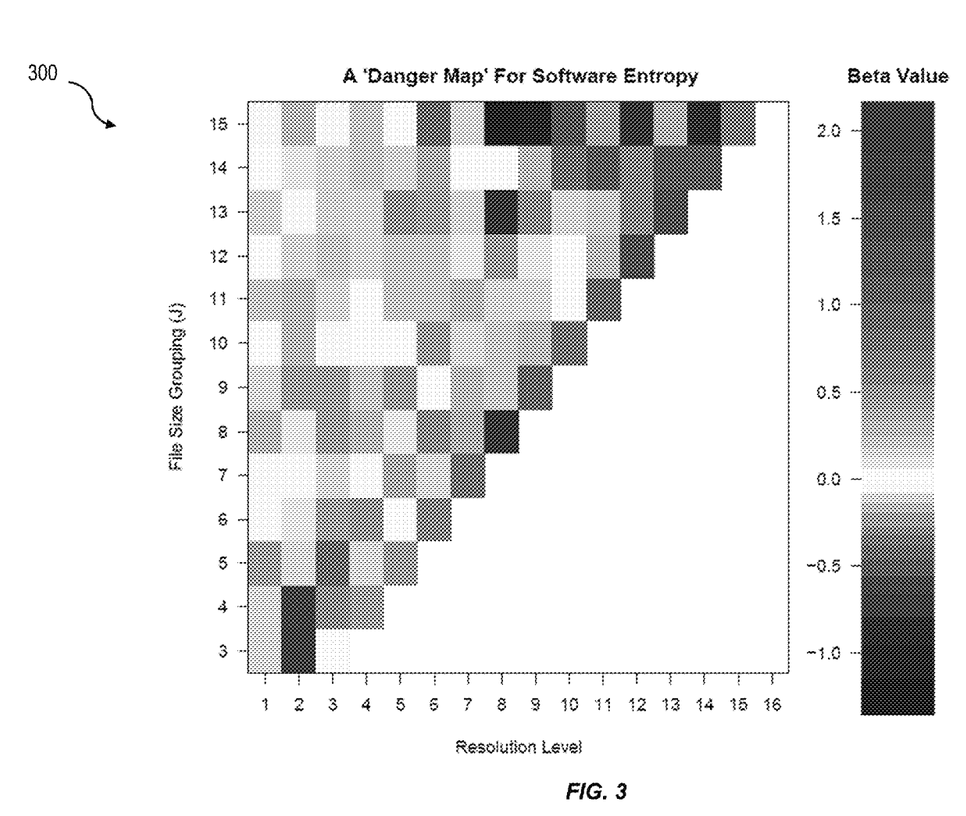
FIG. 3 is a diagram illustrating a likelihood of a file being malware across various file size groupings, based on the energy spectrum formed through a wavelet decomposition of the file's entropy.

It can also be analyzed whether the trends found in the single level analysis of n=1,599 files hold up in the full corpus of n=39,968 files. Diagram 300 of FIG. 3, illustrates the results of logistic regression models fit to each file size grouping separately. The full analysis supports a generality that, to a first approximation, coarse-energy-is-bad, fine-energy-is-good. Indeed, across most file sizes, high energies at the finest-level of resolution appear to be indicative of file legitimacy, and high energies at coarse levels of resolution are often associated with suspiciousness. However, this generalization does not appear to capture the full amount of information available about suspicious patterns within a file's entropic energy spectrum. Indeed, if this phrase provided a complete description of the results, then the matrix in diagram 300 should have rows whose colors monotonically transformed from a first color (e.g., blue) to a second color (e.g., red). However, FIG. 3 shows an arrangement similar to a damped sinusoidal pattern across the rows. Indeed, the appearance of the double diagonal bands in colored blue suggest the existence of somewhat regular vacillations in terms of how "suspicious" high entropic energy would look at a particular level of resolution. For example, if file size group J=10 is considered as an illustrative example of a "larger" file size, then the fitted logistic regression model can conclude, based on analysis of n=4, 801 files, that a particularly suspicious file would have high concentrations of energy at levels 15, a low concentration of energy at level 6, high concentrations of energy at levels 78, and low concentrations of entropic energy at levels 910. A likelihood ratio test can reveal that the overall 10-feature model provides a significantly better description of malware vs. software than mere random guessing, $X^2(10)=283.3$, $p<10^{-10}$. Moreover, many of the beta weights for particular resolution energies are related to the response variable (malware vs. not) in statistically significant ways: the positive beta at resolution level 2 ($z=8.5$, $p<2e^{-16}$), the negative beta at resolution level 6 ($z=-6.8$, $p<5e^{-12}$), the positive betas at resolution levels 7 and 8 ($z$'s=3.2,3.8; p's<0.001, 0.0001), and the negative betas at resolution levels 9 and 10 ($z$'s=2.5,6.6, p's<0.013,$3.79e^{-11}$). These statistical results can reinforce the broad conclusion that maximally suspicious files actually vacillate (in particular ways) between high and low energies across resolution levels.

Moreover, the distribution of colors in the danger map diagram 300 of FIG. 3, while not sufficiently simplistic to be easily verbalizable, are far from obtainable by random chance. Likelihood ratio tests comparing the fit of the size-specific models (where the beta coefficients of each size-specific model are given by the specific colorings in the corresponding row of the danger map) versus the fit of models with no features (interpretable as a uniform color across rows, where the intensity of the color is determined by baseline malware rates, independent of the wavelet energy spectrum) suggest that the particular patterning in the danger map provides a statistically significantly better description of malware than random (baseline-informed) guessing alone. Indeed, moving from bottom (J=3) to top (J=16) of the FIG. 4, one has:

$$\chi^2(3)=198.36, \chi^2((4)=563.51, \chi^2(5)=257.52,$$

$$\chi^2(6)=235.09, \chi^2(7)=150.11, \chi^2(8)=585.57$$

$$\chi^2(9)=662.22, \chi^2(10)=283.24, \chi^2(11)=385.33,$$

$$\chi^2(12)=305.04, \chi^2(13)=233.39, \chi^2(14)=116.17,$$

$$\chi^2(15)=61.88, \chi^2(16)=31.44$$

all of which are statistically significant at the $\alpha=0.05$ level.

Altogether, these results suggest that the somewhat complicated patterns of suspiciousness depicted in the danger map of FIG. 3 are useful for fitting the true relationship between energy spectra and malware probabilities. Below it is described how these patterns indeed actually useful for predicting malware.

The diagram 300 of FIG. 3 (aka the danger map) is useful for malware prediction in that the information illustrated therein can be used to construct a single number which can score a piece of software's suspiciousness based on the wavelet decomposition of its entropy time series. Discussed above are techniques for reducing the entropic spectral energy, of dimensionality J, to a single malware suspiciousness score, namely by fitting separate logistic regressions for each file size group, and applying these models to create predicted probabilities for new files. Those predicted probabilities are a feature of interest, namely the SSES.

Table 2 below reports results characterizing the extent to which SSES increases predictive power within various models of malware. In particular, there were three categories of examined models: the base rate model, the length baseline model, and the entropy statistics model. For each kind of model, the incremental contribution of SSES is examined. The intent of this analysis is to provide a stringent test of the null hypothesis that the wavelet-based features are not providing useful predictive information other than what could be derived through simpler features alone.

Table 2 below illustrates the predictive benefits of incorporating the Suspiciously Structured Entropy Score (SSES) within models of malware. This table shows the effect of adding ESS to various statistical models of malware. The arrow reflects the change of adding ESS to the model. The number on the left side of the arrow reflects the result of the model without ESS; the number on the right side of the arrow reflects the result of the model with ESS. "AIC" refers to Aikaike Information Criterion, and is a real-valued measure of model fit which limits overfitting the data by penalizing for model complexity. Lower numbers indicate better models "Model Fit" (%) refers to the percentage of the data which is correctly fit by the model, if the model is forced into making 0/1 (malware/not) predictions. "CV Accuracy" (%) refers to the percentage of files whose malware vs. not status was correctly predicted in a 5-fold cross-validation scheme in which the model was trained on 80% of the data, and then made predictions on the remaining 20% of the data. "Predictive Advantage" is the difference in the model's CV Accuracy with and without ESS. The three "Model Categories" are further explained in the main text.

TABLE 2

| | Model Category | | |
|---|---|---|---|
| | 1. Base Rate | 2. Length Baseline | 3. Entropy Statistics |
| # Parameters | 0 → 1 | 2 → 3 | 8 → 9 |
| AIC | 55409 → 46055 | 52277 → 46055 | 41869 → 40134 |
| Model Fit (%) | 50.0 → 68.9 | 61.9 → 68.9 | 72.1 → 74.6 |
| CV Accuracy (%) | 50.0 → 68.7 | 61.8 → 68.7 | 71.5 → 74.3 |
| Predictive Advantage (%) | +18.7 | +6.9 | +2.8 |

The base rate model predicts malware based on base rates (percentage of files which are malicious) alone. Because 50.01% of the current corpus of n=39,968 files are malware, the base rate model effectively flips a coin to guess whether a file is malicious or legitimate. This technique led to correct predictions 50.0% of the time. Adding ESS as a single predictor variable improved predictive accuracy to 68.7%, an impressive 18.7% gain for a single variable.

The length baseline model predicts malware based on file length. In this corpus, the base rates are strongly quadratic in J. Now because SSES's are determined from J separate logistic regression models, these SSES's automatically incorporate file-size-specific base rates. So in order to determine whether wavelet-based decompositions provide added value beyond mere file-size-specific base-rates, the length baseline model was constructed. The length baselines model is a logistic regression model that incorporates J and $J^2$ as predictors of malware. This model made correct predictions 61.8% of the time. Adding SSES as an additional predictor variable in a 3-variable model improved predictive accuracy to 68.7% (just as before), a gain of 6.9%. Thus, the wavelet-based entropic energy information inherent to ESS is indeed providing useful information for malware detection that goes above and beyond mere information about file length.

The entropy statistics model predicts malware based on summary statistics derived from the entropy time series. The entropy statistics model includes various statistical summary features of the entropy time series. In this example, the entropy statistics model includes eight statistical summary features of the entropy time series which may be relevant for malware detection: mean, standard deviation, signal-to-noise ratio (mean divided by standard deviation), maximum entropy, percentage of the signal with high entropy (where "high entropy" was defined through trial and error on an earlier dataset as being 6.5 bits), percentage of the signal with zero entropy, length of time series, and squared length of the time series. This model made correct predictions 71.5% of the time. Adding ESS as an additional predictor variable improved predictive accuracy to 74.3%, a gain of 2.8%.

All together, it was demonstrated that ESS has strong predictive value for malware detection. The single feature alone improved predictive accuracy, within a balanced sample of malware and legitimate software, from 50% to 68.7%. Moreover, even in more complicated model with 8 additional features related to the file's entropy time series representation, ESS improved predictive accuracy by 2.8%, which in this sample of n=39,968 meant that an additional 1,119 files were accurately classified.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   analyzing, by at least one data processor, a data file to obtain characters contained in the data file, the characters split into a plurality of data file chunks;
   representing, by the at least one data processor, the data file as a plurality of entropy values reflective of an amount of entropy across the plurality of file chunks;
   applying, by the at least one data processor, a wavelet transform to the plurality of entropy values to generate a wavelet energy spectrum that represents an amount of entropic energy at multiple levels of resolution;
   determining, by the at least one data processor and using at least one predictive model, which levels of resolution of the multiple levels of resolution exert the strongest influences on a probability of the data file being malicious and whether the entropic energy at such levels of resolution make a likelihood of the data file being malicious larger or smaller;
   calculating, by the at least one data processor, a suspiciously structured entropy score based on the wavelet energy spectrum and the determination, wherein the suspiciously structured entropy score represents a probability of whether or not the data file is likely to be malicious; and
   incorporating, by the at least one data processor, the suspiciously structured entropy score within an existing malware model.

2. The method of claim 1, wherein the plurality of file chunks are non-overlapping.

3. The method of claim 1, wherein the plurality of file chunks have fixed length.

4. The method of claim 1, wherein the wavelet transform is applied based on at least a coefficient representing a difference of mean entropy levels between adjacent file chunks.

5. The method of claim 1, wherein the data file comprises encrypted segments concealing malicious commands.

6. The method of claim 1, wherein the data file comprises compressed segments concealing malicious commands.

7. The method of claim 1, wherein the at least one predictive model is trained using data sets comprising files known to contain malware.

8. The method of claim 6, wherein the at least one predictive model comprises a logistic regression model.

9. The method of claim 6, wherein the at least one predictive model comprises a neural network model and/or a support vector machine.

10. The method of claim 1, wherein the wavelet transform is a Haar wavelet transform.

11. A system comprising:
    at least one data processor; and
    at least one memory storing instructions which, when executed by the at least one data processor, causes operations comprising:
        analyzing, by at least one data processor, a data file to obtain characters contained in the data file, the characters split into a plurality of file chunks;
        representing, by the at least one data processor, the data file as a plurality of entropy values reflective of an amount of entropy across the plurality of file chunks;
        applying, by the at least one data processor, a wavelet transform to the plurality of entropy values to generate a wavelet energy spectrum that represents an amount of entropic energy at multiple levels of resolution;
        determining, by the at least one data processor and using at least one predictive model, which levels of resolution of the multiple levels of resolution exert the strongest influences on a probability of the data file being malicious and whether the entropic energy at such levels of resolution make a likelihood of the data file being malicious larger or smaller;
        calculating, by the at least one data processor, a suspiciously structured entropy score based on the wavelet energy spectrum and the determination, wherein the suspiciously structured entropy score represents a probability of whether or not the data file is likely to be malicious; and
        incorporating, by the at least one data processor, the suspiciously structured entropy score within an existing malware model.

12. The system of claim 11, wherein the plurality of file chunks are non-overlapping.

13. The system of claim 11, wherein the plurality of file chunks have fixed length.

14. The system of claim 11, wherein the wavelet transform is applied based on at least a coefficient representing a difference of mean entropy levels between adjacent file chunks.

15. The system of claim 11, wherein the data file comprises encrypted segments concealing malicious commands.

16. The system of claim 11, wherein the data file comprises compressed segments concealing malicious commands.

17. The system of claim 11, wherein the at least one predictive model is trained using data sets comprising files known to contain malware.

18. The system of claim 17, wherein the at least one predictive model comprises a logistic regression model.

19. The system of claim 17, wherein the at least one predictive model comprises a neural network model and/or a support vector machine.

20. The system of claim 11, wherein the wavelet transform is a Haar wavelet transform.

21. A non-transitory computer program product storing instructions which, when executed by at least one data processor forming part of at least one computing system, result in operations comprising:

analyzing, by at least one data processor, a data file to obtain characters contained in the data file, the characters split into a plurality of file chunks;

representing, by the at least one data processor, the data file as a plurality of entropy values reflective of an amount of entropy across the plurality of file chunks;

applying, by the at least one data processor, a wavelet transform to the plurality of entropy values to generate a wavelet energy spectrum that represents an amount of entropic energy at multiple levels of resolution;

determining, by the at least one data processor and using at least one predictive model, which levels of resolution of the multiple levels of resolution exert the strongest influences on a probability of the data file being malicious and whether the entropic energy at such levels of resolution make a likelihood of the data file being malicious larger or smaller;

calculating a suspiciously structured entropy score based on the wavelet energy spectrum and the determination, wherein the suspiciously structured entropy score represents a probability of whether or not the data file is likely to be malicious; and     incorporating, by the at least one data processor, the suspiciously structured entropy score within an existing malware model.

22. The non-transitory computer program product of claim 21, wherein the plurality of file chunks are non-overlapping.

23. The non-transitory computer program product of claim 21, wherein the plurality of file chunks have fixed length.

24. The non-transitory computer program product of claim 21, wherein the wavelet transform is applied based on at least a coefficient representing a difference of mean entropy levels between adjacent file chunks.

25. The non-transitory computer program product of claim 21, wherein the data file comprises encrypted segments concealing malicious commands.

26. The non-transitory computer program product of claim 21, wherein the data file comprises compressed segments concealing malicious commands.

27. The non-transitory computer program product of claim 21, wherein the at least one predictive model is trained using data sets comprising files known to contain malware.

28. The non-transitory computer program product of claim 27, wherein the at least one predictive model comprises a logistic regression model.

29. The non-transitory computer program product of claim 27, wherein the at least one predictive model comprises a neural network model and/or a support vector machine.

30. The non-transitory computer program product of claim 21, wherein the wavelet transform is a Haar wavelet transform.

\* \* \* \* \*